United States Patent [19]

Dever et al.

[11] Patent Number: 5,882,551

[45] Date of Patent: *Mar. 16, 1999

[54] BROMINATED SYNDIOTACTIC POLYSTYRENE AND THE USE THEREOF

[75] Inventors: James L. Dever, Copley Township; James C. Gill, Macedonia, both of Ohio

[73] Assignee: Ferro Corporation, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 827,840

[22] Filed: Apr. 11, 1997

Related U.S. Application Data

[63] Continuation of Ser. No. 418,097, Apr. 6, 1995, abandoned.

[51] Int. Cl.$^6$ .................. C09K 21/08; C08F 8/22
[52] U.S. Cl. .................. 252/609; 524/464; 524/469; 525/355; 525/357; 525/356
[58] Field of Search .................. 252/609; 526/293, 526/294, 296; 525/355, 356, 357; 524/409, 469, 464

[56] References Cited

U.S. PATENT DOCUMENTS

| | | | |
|---|---|---|---|
| 3,050,476 | 8/1962 | Tress et al. | 260/2.5 |
| 4,200,702 | 4/1980 | Gausepohl et al. | 525/72 |
| 4,200,703 | 4/1980 | Diebel et al. | 525/357 |
| 4,352,909 | 10/1982 | Barda et al. | 525/157 |
| 4,360,455 | 11/1982 | Lindenschmidt et al. | 252/609 |
| 4,774,301 | 9/1988 | Campbell, Jr. et al. | 526/165 |
| 4,808,680 | 2/1989 | Schmidt et al. | 526/160 |
| 4,824,629 | 4/1989 | Seitz et al. | 264/291 |
| 5,109,068 | 4/1992 | Yamasaki et al. | 525/151 |
| 5,200,454 | 4/1993 | Nakano | 524/409 |
| 5,321,122 | 6/1994 | Kuramoto et al. | 528/488 |
| 5,391,611 | 2/1995 | Funayama et al. | 524/508 |
| 5,532,322 | 7/1996 | Kadono et al. | 525/357 |
| 5,616,656 | 4/1997 | Dever et al. | 525/355 |
| 5,637,650 | 6/1997 | Gill et al. | 525/356 |

FOREIGN PATENT DOCUMENTS

WO8702998  5/1987  WIPO.

OTHER PUBLICATIONS

Candia et al., "Noncrystalline Order in Swollen Syndiotactic Polystyrene," Macromolecules, vol. 25, No. 23, 1992, pp. 6361–6364.

Soga et al., "Copolymerization of Styrene and Substituted Styrenes with Ti(Omen)$_4$ –Methylaluminoxane Catalyst", Macromolecules, 23, pp. 953–957 (1990).

Grassi et al., "Reactivity of Some Subtituted Styrenes in the Presence of a Syndiotactic Specific Polymerization Catalyst", Macromolecules, 22, pp. 104–108 (1989).

Isihara et al., "Stereospecific Polymerization of Styrene Giving the Syndiotactic Polymer", Macromolecules, 21, pp. 3356–3360 (1980).

*Primary Examiner*—Joseph D. Anthony
*Attorney, Agent, or Firm*—Rankin, Hill, Porter & Clark LLP

[57] ABSTRACT

The present invention provides a new flame-retardant additive comprising brominated syndiotactic polystyrene. The additive has a melting temperature in excess of about 325° C. and it displays a noncrystalline order. The additive also has less than 1500 ppm halogen located on the backbone of the syndiotactic polystyrene as measured in HBr equivalents. The additive provides for better color and improved thermal stability as compared to the use of conventional brominated polystyrene.

3 Claims, No Drawings

BROMINATED SYNDIOTACTIC POLYSTYRENE AND THE USE THEREOF

This application is a continuation of application Ser. No. 08/418,097 filed on Apr. 6, 1995 now abandoned.

FIELD OF INVENTION

The present invention concerns a new material or additive for use as a flame retardant. More particularly, the present invention concerns a new and improved flame-retardant additive comprising brominated syndiotactic polystyrene, and methods for using such additive.

BACKGROUND

Flame-retardant additives and methods of making and using the same are well-known in the prior art. Flame retardant additives are added to many polymers during processing so as to render the finished product made with such polymers resistant to ignition.

One class of flame retardants that is used extensively in industry comprises halogenated polymers of styrenic monomers. An example of a commercially successful product of this class is a brominated polystyrene flame retardant additive sold by the Ferro Corporation of Cleveland, Ohio, under the trademark PYRO-CHEK® 68PB.

U.S. Pat. No. 4,352,909 which is owned by Ferro Corporation discloses a method for producing a brominated polystyrene flame retardant additive such as PYRO-CHEK 68PB. Additional examples of references that disclose methods for producing brominated styrenic polymers are Naarmann et al., U.S. Pat. No. 4,143,221, Diebel et al., U.S. Pat. No. 4,200,703 and Lindenschmidt et al., U.S. Pat. No. 4,360,455.

Brominated styrenic polymers are utilized to impart flame retardant properties to a broad range of polymeric resins. Such polymeric resins include, for example, polyamides, polyesters such as PET and PBT, polyolefins and styrenic polymers such as HIPS, ABS, SAN, etc. Unfortunately, the use of commercially available flame retardant additives, such as conventional atactic brominated polystyrene, in high temperature resins such as, syndiotactic polystyrene resin or certain high temperature polyamides is generally not feasible. For example, the use of conventional brominated polystyrene additives in high temperature polymeric resins can lead to a material having unacceptable color and inadequate levels of thermal stability.

Nakano U.S. Pat. No. 5,200,454 talks briefly of adding a halogenated syndiotactic polystyrene to syndiotactic polystyrene polymeric resin. However, Nakano '454 provides absolutely no insight into the physical properties of such additive or how one can produce such an additive.

The commercial trend over the last ten years has been to utilize host polymeric resins displaying increasingly higher working temperatures. The present invention meets the challenges created by this trend by providing a flame-retardant additive that is well suited for use in today's high temperature polymeric resins.

SUMMARY OF THE INVENTION

The present invention provides a new and improved flame retardant additive comprising brominated syndiotactic polystyrene and a novel method for using such additive. The flame-retardant additive of the present invention provides for better color and improved thermal stability as compared to the use of conventional brominated polystyrene in host polymeric resins.

The flame-retardant additive of the present invention comprises brominated syndiotactic polystyrene having a melting temperature in excess of about 325° C. and a degradation temperature in excess of about 325° C. The additive is preferably produced utilizing an inert reaction medium that is incapable of dissolving to any appreciable degree syndiotactic polystyrene at ambient temperature and pressure.

The invention further provides a method of flame retarding host polymeric resins using the brominated syndiotactic polystyrene of the present invention.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

Brominated syndiotactic polystyrene made in accordance with the present invention is produced by suspending syndiotactic polystyrene in an inert reaction medium and reacting the syndiotactic polystyrene with a brominating agent in the presence of a Lewis acid catalyst to produce brominated syndiotactic polystyrene of the general structure:

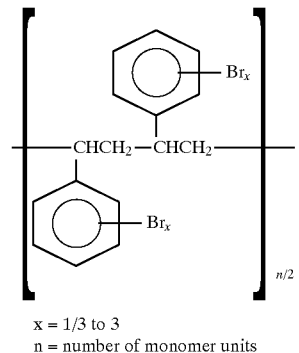

$x = 1/3$ to 3
n = number of monomer units

As discussed further below, the selection of the reaction medium is critical. In the prior art, the bromination of a styrenic polymer to a useful level of bromination (i.e., over 15% by weight bromine) was always conducted in a solution by use of a solvent. However, quite unexpectedly, applicants have found in respect to the present invention that the use of an inert reaction medium that does not dissolve the syndiotactic polystyrene during bromination results in a brominated syndiotactic polystyrene which is superior in properties to brominated polystyrene, including brominated syndiotactic polystyrene obtained by the traditional in-solution process.

The syndiotactic polystyrene for use in producing the additive of the present invention is a polystyrene having mainly the syndiotactic configuration. The polystyrene having mainly syndiotactic configuration means a polymeric material having a configuration that with respect to a main polymer chain comprising a carbon-carbon bond, and phenyl groups or substituted phenyl groups, has substituents that are positioned alternately on the opposite sides of the plane of the main polymer chain. Preferably, at least 60% by weight, and more preferably at least 75% by weight of the syndiotactic polystyrene resin displays a syndiotactic configuration.

The syndiotactic polystyrene to be used in the present invention may vary in molecular weight. Thus, syndiotactic polystyrenes having various distributions of molecular weight can be used. The weight average molecular weight of the syndiotactic polystyrene polymer is usually from about 200,000 to about 550,000 although it is not limited thereto.

The syndiotactic polystyrene having mainly syndiotactic configuration can be prepared, for example, by polymerizing a styrene monomer in the presence of a catalyst such as a catalyst comprising a titanium compound and an aluminum organo compound. Campbell, Jr. et al., U.S. Pat. No. 4,774,301, Schmidt et al., U.S. Pat. No. 4,808,680 and Seitz et al., U.S. Pat. No. 4,824,629 are incorporated herein by reference for their teachings of how to produce syndiotactic polystyrene.

Applicants believe that the present invention is best practiced using powdered, as compared to a conventional pelletized form. More particularly, the syndiotactic polystyrene utilized preferably has an average particle size of from about 0.1 to about 10 microns.

Lewis acid catalysts which are suitable for the process according to the invention and are used in amounts of from about 0.10% to 40% by weight, preferably from about 0.20% to 20% by weight, based on the weight of syndiotactic polystyrene used or charged, include, for example, iron-(III) chloride ($FeCl_3$), $SbCl_3$, $SbCl_5$, iron-(III) bromide ($FeBr_3$), aluminum-(III) chloride ($AlCl_3$), aluminum-(III) bromide ($AlBr_3$), boron-(III) bromide ($BBr_3$), boron-(III) chloride ($BCl_3$), copper-(II) bromide ($CuBr_2$), $SbBr_3$, $TiCl_4$, $TiBr_4$, $SnCl_2$, $SnCl_4$, $AlBr_3$, $BeCl_2$, $CdCl_2$, $ZnCl_2$, $BF_3$, $BiCl_3$, $ZrCl_4$ and mixtures thereof. Care must be taken not to use a Lewis acid catalyst that crosslinks the syndiotactic polystyrene during the halogenation process when a halogen containing reaction medium is employed. Diebel et al., U.S. Pat. No. 4,200,703 is incorporated herein by reference for its teachings concerning the use of a Lewis base to prevent crosslinking during bromination.

The Lewis acid catalysts exhibit different levels of activity. Moisture, methanol and other materials that dissociate or complex with the catalyst affect the level of activity of any given catalyst. For example, with respect to $SbCl_3$ less than 5% of the catalyst $SbCl_3$ can be used to achieve tribromination if the system is essentially dry. An "essentially dry" or "substantially anhydrous" system or reaction mixture is one in which all of the reaction medium employed has been azeotropically distilled to remove water. Typically this produces a moisture content of 0.002% or less based on the use of an ethylene dichloride reaction medium. Other components are purchased or made up to be as dry as feasible when employing a catalyst such as $SbCl_3$. Comparable bromination results cannot be obtained if higher levels of moisture are present.

Bromine and bromine chloride may be used as the brominating agent. Bromine chloride is the preferred brominating agent for use in practicing the preferred mode of the invention when $SbCl_3$ or a catalyst of similar activity is utilized. As compared to the use of bromine per se, bromine chloride is generally preferred.

The reaction medium that is employed in the process is critical. The reaction medium must not dissolve the syndiotactic polystyrene to any appreciable degree at standard bromination temperatures and ambient pressures (i.e., 70° F. and 1 atmosphere). During the bromination process the suitable reaction medium is one in which the order of the syndiotactic styrenic polymer is not substantially altered at standard bromination conditions.

Examples of reaction media that are suitable for use in the present invention include, for example, 1,2-dichloroethane, chloroform, carbon tetrachloride, methylene bromide, 1,2-dibromoethane, 1,1,2-trichloroethane, and ethylene dichloride (EDC) and mixtures of such media. Materials that are not preferred for use with the present invention include, for example, 1,1,2,2-tetrachloroethane for it will dissolve the syndiotactic polystyrene and produce a solution.

To carry out the process according to the invention, the syndiotactic polystyrene and a suitable reaction medium are first introduced into a reaction vessel apparatus, which may, for example, be a stirred vessel. One of the conventional bromination catalysts is then added. The mixture is stirred and the desired amount of brominating agent is run in at from about −30° C. to about 50° C., preferably from about −20° C. to about 45° C. After completion of the reaction, the product may be isolated utilizing any one of several conventional isolation techniques such as, for example, flashing of the reaction medium by the addition of the reaction mixture to hot water. The product is then isolated from the water by conventional filtration and then dried.

The product obtained by the above process may be used for flame retarding thermoplastics. The high heat stability and good resultant color of the additive obtained by the above process deserve particular mention. Suitable thermoplastics for such flame retarding include, for example, polyamides such as polyphthalamides, Nylon 6, Nylon 6,6, Nylon 4,6 and Nylon 6,12, polyesters such as polyethylene terephthalate (PET), polycyclohexylene dimethylene terephthalate (PCT) and polybutylene terephthalate (PBT), polymers and copolymers of α-olefins such as polyethylene, polypropylene, polybutene, poly-4-methyl pentene-1, propylene/ethylene copolymers, copolymers of 4-methyl pentene-1 with linear α-olefins containing 4 to 18 carbon atoms, and ethylene/vinyl acetate copolymers, and styrenic polymers such as polystyrene (both atactic and syndiotactic), high impact polystyrene (HIPS), styrene/acrylonitrile copolymers (SAN), copolymers of acrylonitrile/butadiene/styrene (ABS), and polymers and copolymers of vinyl chloride, vinyl acetate, vinyl butyral, substituted styrenes such as α-methyl styrene, methyl methacrylate and vinylidene chloride, polysulphones and copolysulphones, polyphenylene oxides, polycarbonates, polymers and copolymers of acetals, and thermoplastic polyurethanes. Blends of the above-mentioned thermoplastic resins may also be used.

The incorporation, into thermoplastics, of the brominated syndiotactic polystyrene additive and of synergistic agents which may or may not be used, as well as the incorporation of further additives which may be employed, can be carried out by suitable conventional mixing processes, for example in extruders, Banbury mixers, two roll mills or other plastic processing equipment. Self-extinguishing moldings and profiles can be produced, by injection-molding or extrusion, from the mixtures with thermoplastics prepared using the additive product or blended product resulting from the process according to the invention.

Effective amounts of the brominated syndiotactic polystyrene of the present invention are generally present from about 2% to about 40% by weight, preferably from about 5% to about 35% by weight of the total final composition (i.e., the host or base polymeric resin(s) and the brominated syndiotactic polystyrene, fillers, other additives, etc.).

The blends of the present invention can contain various conventional additives in conventional amounts as known in the art. For example, additives such as UV light inhibitors or stabilizers, lubricant agents such as calcium stearate, antimony base synergists, heat stabilizers and other additives.

Brominated syndiotactic polystyrene made in accordance with the present invention displays a melting temperature of over 325° C. and has less than 1500 ppm halogen located on the backbone of the polystyrene as measured in HBr equivalents. In comparison, brominated syndiotactic polystyrene made in-solution displays a softening point well below 300° C. and it has well over 3500 ppm (and typically over 6000 ppm) halogen on the backbone of the polystyrene as measured in HBr equivalents.

Halogen on the backbone of the polystyrene is very undesirable. The halogen is preferably located on the ring of the polystyrene. Backbone halogenation leads to numerous problems such as poor thermal stability for the end user.

Brominated syndiotactic polystyrene made in accordance with the present invention also displays a thermal stability of less than about 1500 ppm HBr by the GE thermal stability test as compared to in-solution made brominated syndiotactic polystyrene which displays a thermal stability of over about 6000 ppm HBr by the GE thermal stability test. Further, it has been noted that brominated syndiotactic polystyrene made in accordance with the present invention displays a melting point and thus it is non-amorphous and it displays at ambient conditions a noncrystalline order. To the contrary, brominated syndiotactic polystyrene made in-solution is amorphous in nature and it does not display a melting point. A noncrystalline order is well documented and discussed beginning at Volume 4, page 449 of the *Encyclopedia of Polymer Science and Technology* ©1966.

In order to further illustrate the invention, the following Examples are provided. Unless otherwise indicated, in the following Examples as well as throughout the entire specification and in the appended claims, all parts and percentages are by weight and all temperatures are in degree Centigrade.

EXAMPLE I

Into a 5 L resin flask equipped with a mechanical stirrer, thermometer, spiral condenser, and a 500 mL jacketed pressure equalized addition funnel was placed 300.6 g (2.886 mole based upon molecular weight of a styrene repeating unit) powdered syndiotactic polystyrene having a weight average molecular weight of 450,000 and 2100 mL of 1,2 dichloroethane (EDC). To the stirred mixture was added 15 g (0.06576 mole) antimony trichloride (added as a solution in EDC—0.4 g/mL) and the mixture was cooled to 15° C. Bromine chloride 1125.0 g (9.75 mole) (added as a solution in EDC—50% w/w) was added to the flask at a rate of 3.25 moles/hr BrCl while keeping the bromination temperature at approximately 20° C.±2° C. After the addition of the BrCl was completed, the reaction mass was held at 20°–25° C. for an additional three hours (total contact time is six hours) Aqueous sodium bisulfite (620 g of 20% $NaHSO_3$) was added at such a rate as to not exceed 35° C. A weight of deionized water, equal to the weight of the aqueous sodium bisulfite used, was added to the mixture. The entire mass was stirred for an additional ten minutes, and then filtered to yield a white solid.

The white solid was washed three times by slurrying each time with 2500 mL of fresh deionized water for two hours, and filtering. During the second and third washes, the product exhibited a creamy/shaving cream like texture. After the third wash, the solid was charged along with six liters of deionized water to an appropriately sized resin flask equipped with a mechanical stirrer, distillation head, condenser, receiver, and heating mantle. The resulting slurry was heated gradually whereupon the EDC/water azeotrope was removed from the system. Ultimately the slurry was heated to 100° C. and was held at that temperature for two additional hours. During this time, the pH of the slurry was adjusted from 4 to 8 by the incremental addition of 10% aqueous NaOH. Propanol was added to the slurry to serve as a wetting aid and the slurry was then stirred at 80° C. for four hours.

The product was collected by filtration, washed on a filter with 4 L of hot deionized water and then 2 L of cold deionized water. The product was vacuum dried at 100° C. at 5–10 torr for 48 hours. The total yield of brominated syndiotactic polystyrene product was approximately 930 grams.

EXAMPLE II

Eighty-six grams of syndiotactic polystyrene was mixed in an extruder with 10 grams of the brominated syndiotactic polystyrene of Example I and 4 grams of $Sb_2O_3$. The flame-retarded composition displayed a flame retardance of V-O at ⅛ inch UL94.

EXAMPLE III

Utilizing the brominated syndiotactic polystyrene (BrSPS) of Example I, the following flame retarded blends were produced using a twin screw extruder.

| Host Polymer | Parts By Weight Formulation | Oxygen Index For Host Polymer With No Flame Retardant | Oxygen Index With Flame Retardant | UL94-⅛" |
|---|---|---|---|---|
| HIPS-Huntsman 840 | 81HIPS/ 4Sb$_2$O$_3$/ 15BrSPS | 18.10 | 23.91 | V-O |
| ABS-GE Cycolac L1000 | 74ABS/ 6Sb$_2$O$_3$/ 20BrSPS | 17.77 | 25.98 | V-O |
| PET-DuPont Rynite 530 | 83PET/ 4Sb$_2$O$_3$/ 13BrSPS | 20.10 | 30.60 | V-O |
| PBT-Celanex 2002-2 | 77PBT/ 6Sb$_2$O$_3$/ 16BrSPS | 21.80 | 26.60 | V-O |
| Nylon 6,6-Dupont Zytel 101 | 72Nylon/ 7Sb$_2$O$_3$/ 21BrSPS | 26.25 | 27.13 | V-O |
| PPO-GE Noryl 731 | 84PP/ 4Sb$_2$O$_3$/ 12BrSPS | 23.17 | 31.08 | V-O |
| LDPE Mobil LMA 003 | 60LDPE/ 10Sb$_2$O$_3$/ 30BrSPS | 18.46 | 24.59 | V-O |

EXAMPLE IV

Into a dried 100 gallon glass-lined reactor equipped with three-bladed retreating blade agitator, dip tube, H-style finger baffle with thermowell, condenser, receiver and scrubber are charged with stirring 421.0 pounds dry 1,2-dichloroethane (EDC), 47.5 pounds (0.4561 pounds-moles based on styrene repeating units) powdered syndiotactic polystyrene and 2.399 pounds (0.01052 pounds-mole) antimony trichloride dissolved in 0.75 gallon dry 1,2-dichloroethane. The mixture is stirred and cooled to 16° C. Bromine chloride, 180.0 pounds (1.560 pounds-mole), is added to the mixture at a rate of 1 lb/min, while keeping the reaction temperature between 20°–25° C. Approximately 2.75 hours into the bromine chloride addition, the mixture thickened into a pasty, but stirrable, mass. After the three-hour bromine chloride feed, the mixture is stirred for another 9 hours, maintaining the temperature at 20°–25° C. Aqueous sodium bisulfite, 400 pounds of 10% w/w, is then pumped in to neutralize the unreacted bromine chloride, followed by pH adjustment of the reaction mixture to pH 7 with 310 pounds 10% w/w aqueous sodium hydroxide. The crude product was then collected via centrifuge.

The solid was washed three times by slurrying each time in the reactor with 500 lb fresh water and centrifuging. After the third wash, the solid was charged back to the reactor, 500 pounds fresh water added and the mixture was heated with stirring to about 77° C., whereupon the EDC/water azeotrope was removed from the system. The resulting slurry was then gradually heated to 100° C. and held there for 2 hours. The slurry was then cooled and centrifuged to collect the solid product wet cake.

The wet cake was dried in a rotary vacuum drier at 110° C./25–26" Hg vacuum for 48 hours, giving an off-white powder. The process yielded about 141 pounds of material.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

What is claimed:

1. A flame retardant additive comprising brominated syndiotactic polystyrene that displays a noncrystalline order produced by a process comprising brominating syndiotactic polystyrene in an inert reaction medium that is incapable of dissolving to any appreciable degree syndiotactic polystyrene at ambient temperature and pressure, said brominated syndiotactic polystyrene having a melting temperature in excess of about 325° C.

2. A flame-retardant additive as set forth in claim 1 having less than 1500 ppm halogen located on the backbone of the syndiotactic polystyrene as measured in HBr equivalents.

3. A flame-retardant additive as set forth in claim 1 having at least 15% by weight bromine.

* * * * *